United States Patent
Bakan et al.

(10) Patent No.: US 10,844,919 B2
(45) Date of Patent: Nov. 24, 2020

(54) WET FRICTION MATERIAL PRODUCTION METHODS

(71) Applicant: SCHAEFFLER TECHNOLOGIES AG & CO. KG, Herzogenaurach (DE)

(72) Inventors: Murat Bakan, Wooster, OH (US); Rashid Farahati, Copley, OH (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 16/363,685

(22) Filed: Mar. 25, 2019

(65) Prior Publication Data

US 2020/0309219 A1    Oct. 1, 2020

(51) Int. Cl.
*F16D 69/02* (2006.01)
*F16D 13/74* (2006.01)
(Continued)

(52) U.S. Cl.
CPC ............. *F16D 69/026* (2013.01); *D06B 3/02* (2013.01); *D06B 3/10* (2013.01); *D06B 3/18* (2013.01); *D06B 5/14* (2013.01); *D06B 15/02* (2013.01); *D06B 15/04* (2013.01); *F16D 13/74* (2013.01); *B05D 1/18* (2013.01); *B05D 3/007* (2013.01); *B05D 3/0493* (2013.01); *B05D 3/12* (2013.01); *B05D 5/00* (2013.01); *B05D 2203/22* (2013.01); *B05D 2518/00* (2013.01);
(Continued)

(58) Field of Classification Search
CPC .......... F16D 13/00; F16D 13/64; F16D 13/74; F16D 2069/001; F16D 2069/008; F16D 2200/0039; F16D 2200/0056; F16D 2200/006; F16D 2200/0065; F16D 2200/0091; F16D 69/00; F16D 69/02; F16D 69/025; F16D 69/026; F16D 69/027; F16D 69/028; D06B 1/00; D06B 15/02; D06B 15/04; D06B 3/00; D06B 3/02; D06B 3/10; D06B 3/18; D06B 5/14; B05D 1/18; B05D 2203/22; B05D 2518/00; B05D 2601/00; B05D 2601/20; B05D 2601/22; B05D 3/007; B05D 3/0493; B05D 3/12; B05D 5/00
See application file for complete search history.

(56) References Cited

U.S. PATENT DOCUMENTS 5,858,883 A * 1/1999 Lam ................. C04B 30/02
                                                427/386
6,630,416 B1 * 10/2003 Lam ................. C08L 61/06
                                                427/201
(Continued)

FOREIGN PATENT DOCUMENTS

EP    2634448 A1 *  9/2013 .......... F16D 69/026
JP    2007100933 A *  4/2007
(Continued)

*Primary Examiner* — William P Fletcher, III

(57) ABSTRACT

A method of producing a friction material. The method includes mixing silica containing filler particles and a liquid binder to form a binder-filler liquid mixture. The method also includes saturating a fibrous base material with the binder-filler liquid mixture to form a saturated fibrous base material. The method further includes curing the saturated fibrous base material at a predetermined temperature for a predetermined time to cure the saturated fibrous base material to form the friction material.

15 Claims, 5 Drawing Sheets

(51) Int. Cl.
*D06B 5/14* (2006.01)
*D06B 3/02* (2006.01)
*D06B 15/02* (2006.01)
*D06B 3/18* (2006.01)
*D06B 15/04* (2006.01)
*D06B 3/10* (2006.01)
*F16D 13/64* (2006.01)
*F16D 69/00* (2006.01)
*B05D 3/12* (2006.01)
*B05D 1/18* (2006.01)
*B05D 3/04* (2006.01)
*B05D 3/00* (2006.01)
*B05D 5/00* (2006.01)

(52) U.S. Cl.
CPC ...... *B05D 2601/00* (2013.01); *B05D 2601/20* (2013.01); *F16D 13/64* (2013.01); *F16D 2069/001* (2013.01); *F16D 2069/008* (2013.01); *F16D 2200/006* (2013.01); *F16D 2200/0039* (2013.01); *F16D 2200/0056* (2013.01); *F16D 2200/0065* (2013.01); *F16D 2200/0091* (2013.01)

(56) References Cited

U.S. PATENT DOCUMENTS

| | | | |
|---|---|---|---|
| 8,021,744 B2 | 9/2011 | Lam et al. | |
| 10,132,375 B2 | 11/2018 | Farahati et al. | |
| 2004/0006192 A1* | 1/2004 | Aiba | C08G 8/10 528/129 |
| 2005/0191477 A1 | 9/2005 | Dong | |
| 2005/0281971 A1* | 12/2005 | Lam | F16D 69/026 428/36.4 |
| 2009/0324887 A1* | 12/2009 | McCord | F16D 69/026 428/143 |
| 2011/0111224 A1* | 5/2011 | Lam | F16D 69/026 428/367 |
| 2012/0028035 A1* | 2/2012 | Chavdar | F16D 69/026 428/331 |
| 2013/0037373 A1 | 2/2013 | Dong et al. | |
| 2017/0261057 A1 | 9/2017 | Farahati et al. | |
| 2018/0017122 A1 | 1/2018 | Dong et al. | |

FOREIGN PATENT DOCUMENTS

| | | |
|---|---|---|
| JP | 2007100933 A | 4/2007 |
| KR | 20140071267 A | 6/2014 |

\* cited by examiner

WET FRICTION MATERIAL PRODUCTION METHODS

TECHNICAL FIELD

The present disclosure generally relates to methods for producing wet friction materials for torque converter clutches, double clutches and/or transmission clutch packs, as well as other applications.

BACKGROUND

Wet friction materials are useful for clutch applications. Wet friction materials may be manufactured using a method in which fibrous base materials (e.g., pulp) and mixture materials (e.g., fillers and friction modifiers) are dispersed in water and then formed into paper. After the paper is dried, the formed paper may be impregnated with a thermosetting resin, which is thermoset and then molded under pressure. The functionality of the wet friction material is influenced through the blending of fibrous base materials and mixture materials.

SUMMARY

According to a first embodiment, a method of producing a friction material is disclosed. The method includes mixing silica containing filler particles and a liquid binder to form a binder-filler liquid mixture, saturating a fibrous base material with the binder-filler liquid mixture to form a saturated fibrous base material, and curing the saturated fibrous base material at a predetermined temperature for a predetermined time to cure the saturated fibrous base material to form the friction material. The silica containing filler particles may be present in the friction material in a concentration of 20 to 50 weight % of a total weight of the friction material. The saturating step may be performed by immersing the fibrous base material into a bath of the binder-filler liquid mixture. The silica containing filler particles may be present in the binder-filler liquid mixture in a concentration of 30 to 60 weight % of a total weight of the binder-filler liquid mixture. The binder may be a phenolic resin. The silica containing particles may be diatomaceous earth particles.

According to a second embodiment, a method of producing a friction material is disclosed. The method includes saturating a fibrous base material with a liquid binder to form a saturated fibrous base material. The saturated fibrous base material has a first surface region and a second surface region opposing the first surface region. The method further includes applying silica containing filler particles to the first and/or second surface regions of the saturated fibrous base material to form a surface region impregnated saturated fibrous base material. The method also includes curing the surface region impregnated saturated fibrous base material at a predetermined temperature for a predetermined time to cure the surface region impregnated saturated fibrous base material to form the friction material having a first concentration of the silica containing filler particles in a first friction material surface region and a second concentration of the silica containing filler particles in a second friction material surface region. The first or second concentration may be 20 to 50 weight % silica containing filler particles based on a total weight of the friction material. Each of the first and second concentrations may be 20 to 50 weight % silica containing filler particles based on a total weight of the friction material. Each of the first and second friction material surface regions may have a thickness in a range of 50 to 150 μm. The applying step may include entraining the silica containing filler particles in a gas stream to form an entrained gas stream and applying the entrained gas stream to the first and/or second surface regions of the saturated fibrous base material to form the surface region impregnated saturated fibrous base material. The applying step includes placing the saturated fibrous base material and the silica containing filler particles under vacuum conditions and applying the silica containing filler particles to the first and/or second surface regions of the saturated fibrous base material under vacuum conditions to form the surface region impregnated saturated fibrous base material. The applying step includes scattering the silica containing filler particles over the first and/or second surface regions of the saturated fibrous base material to form the surface region impregnated saturated fibrous base material. The applying step may include applying the silica containing filler particles to the first and/or second surface regions of the saturated fibrous base material under at a predetermined pressure to form the surface region impregnated saturated fibrous base material.

According to a third embodiment, a method of producing a friction material is disclosed. The method includes mixing a first number of silica containing filler particles and a liquid binder to form a binder-filler liquid mixture. The method also includes saturating a fibrous base material with the binder-filler liquid mixture to form a saturated fibrous base material. The method further includes applying a second number of silica containing filler particles to first and/or second surface regions of the saturated fibrous base material to form a surface region impregnated saturated fibrous base material. The method also includes curing the surface region impregnated saturated fibrous base material at a predetermined temperature for a predetermined time to cure the surface region impregnated saturated fibrous base material to form the friction material having a first concentration of the silica containing filler particles in a first friction material surface region and a second concentration of the silica containing filler particles in a second friction material surface region. The binder may be a phenolic resin. The silica containing particles of the first and second number of silica containing filler particles may be of diatomaceous earth particles. The friction material may include more of the second number of silica containing filler particles than the first number of silica containing filler particles.

BRIEF DESCRIPTION OF THE DRAWINGS

The nature and mode of operation of aspects will now be more fully described in the following detailed description taken with the accompanying drawing figures, in which.

DETAILED DESCRIPTION

Figure 1:
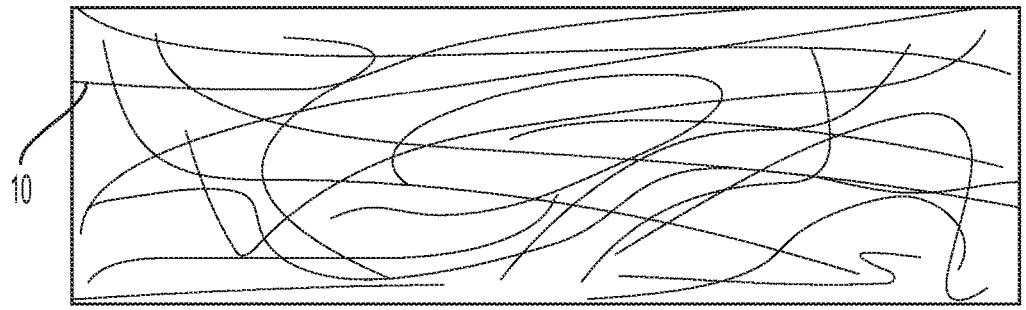
FIG. 1 illustrates a schematic cross-section view of a fibrous base material according to an example aspect.

At the outset, it should be appreciated that like drawing numbers appearing in different drawing views identify identical, or functionally similar, structural elements. Furthermore, it is understood that this disclosure is not limited only to the particular embodiments, methodology, materials and modifications described herein, and as such may, of course, vary. As those of ordinary skill in the art will understand, various features illustrated and described with reference to any one of the figures can be combined with features illustrated in one or more other figures to produce embodiments that are not explicitly illustrated or described.

The terminology used herein is for the purpose of describing particular aspects only, and is not intended to limit the scope of the present disclosure, which is limited only by the appended claims. It is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments.

Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

The term "substantially" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.01%, 0.05%, 0.1%, 0.2%, 0.3%, 0.4%, or 0.5% of the value or relative characteristic.

A wet friction material may be formed by taking a fibrous base material (e.g., pulp) and mixture materials (e.g., fillers and friction modifiers) and dispersing them in water and drying the dispersion to form a paper, which is subsequently impregnated with a thermosetting resin that is thermoset and molded under pressure. This process presents a challenge for many paper manufacturers. Many manufacturers do not have the know how to properly incorporate filling into the wet friction material. Other manufacturers simply refuse to work with fillers that are used in wet friction materials. Presented with these challenges, it is desired to provide a production method in which paper manufacturers do not work with filler materials to make the process easier to implement by the entities, e.g., automotive suppliers and original equipment manufacturers ("OEMs"), using the wet friction materials. In one or more aspects, production methods and related wet friction materials are disclosed that improve the efficiency of the overall process of manufacturing wet friction materials.

With reference to FIG. 1, a cross-sectional view of fibrous base material 10 is shown. Fibrous base material 10 may be an organic or inorganic fiber, for example but without limitation, cellulose fibers, cotton fibers, aramid fibers, carbon fibers, or combinations thereof. In one aspect, fibrous base material 10 is made from substantially pure fibrous material by weight except for any trace impurities that may be included in the pure fibrous material the process of making the fibrous material. In one aspect, the fibrous material is comprised of cellulose fibers that are manufactured from cellulose fibers (e.g., from wood, non-wood materials, recycled paper and agricultural residues) into pulp and then paper. The pulp and paper making process may include steps to minimize the impurities in the finished product. These steps may include screening, defibering and/or deknotting. Similar steps may be applied in the process of manufacturing fibrous materials from other materials, such as cotton fibers, aramid fibers and carbon fibers. The amount of impurities by weight in the substantially pure fibrous material may be any one of the following values or in the range of any two of the following values: 0%, 0.01%, 0.05%, 0.1%, 0.2%, 0.3%, 0.4% and 0.5%. In an aspect, the substantially pure fibrous material does not include any filler material. In other words, the impurities do not include any filler material.

In these aspects, the substantially pure fibrous material may be produced by a paper manufacturer and further processed by the paper manufacturer or another entity to obtain the wet friction material. In these processes, filler material is not added during the fibrous material (e.g., pulp and paper) manufacturing process, but later, after the fibrous material has been formed.

In one aspect, fibrous material 10 is 100% by weight cotton fibers. In another aspect, fibrous material 10 is 100% by weight aramid fibers. In yet another aspect, fibrous material 10 is 100% by weight carbon fibers. Alternatively, up to 10% to 20% by weight of carbon fibers may be substituted for other types of fibers (e.g., cellulose fibers, cotton fibers or aramid fibers).

A filler material (e.g., filler particles) may be arranged for carrying a friction modifier and may be characterized as: (a) capable of having surface interactions with a friction modifier; (b) having a particle shape configured to carry a friction modifier; (c) having a particle size configured to carry a friction modifier; (d) having pores for carrying a friction modifier; or (e) any combination of (a) through (d). In an example aspect, the filler material may include silica. In an example aspect, the silica containing particles are useful to carry, to be available to, to attract, or to encapsulate a friction modifier.

A friction modifier may refer to an additive, component, or ingredient in automatic transmission fluid (ATF) as used in automotive components, such as wet clutches or torque converters. In one example aspect, the friction modifier is configured to provide compatibility between plates of a metal clutch and compatibility between the ATF and the wet clutch or the torque converter. Friction modifiers interact with metal surfaces with polar heads of the friction modifier bonding to the clutch metal surfaces and repulsive forces from the tails of the molecules, for example, aiding in separation of the metal surfaces.

Typical friction modifiers include fatty amines, fatty acids, fatty amides, fatty esters, paraffin waxes, oxidized waxes, fatty phosphates, sulfurized fats, long chain alkylamines, long chain alkylphosphites, long chain alkylphosphates, and borated long chain polars. In an example aspect, the friction modifier comprises a generally straight oleophilic tail portion including 10 to 24 carbons as well as an active polar head group portion. In another example aspect, the tail portion includes 18 to 24 carbons. The head portions form layers on the friction surfaces by surface absorption. Friction modifiers are configured to not corrode or cause degradation to the filler material or the clutch plate, which is typically made of steel. A non-limiting example of a friction modifier useful in an example aspect is stearic acid.

In an example aspect, the filler material is comprised of silica containing particles. The silica containing particles may carry, be available to, attract or encapsulate a friction modifier. In one example aspect, the silica containing particles may be diatomaceous earth particles (DE). DE is a natural silica source formed from sedimentation of single cell aquatic organisms called diatoms. DE can form in marine or fresh water environments and exhibit properties that are related to their unique shape and structure. These properties will vary according to the diatom species found in each deposit, each with differing chemistries, shape factors, and pore structures. Some non-limiting examples of silica containing carrier particles include Celite® 281, DiaFil® 230, and CelTiX™. Celite® 281 is a flux-calcinated diatomaceous earth of plankton marine diatomite. DiaFil® 230 is a natural diatomaceous earth material. CelTiX™ is a fine, natural freshwater diatomaceous earth product with excellent reinforcing ability in most types of elastomers. Silica is also referred to as silicon dioxide or $SiO_2$. The diatomaceous earth generally contains about ten percent other oxides besides silica and is substantially devoid of crystalline silica. Typically, diatomaceous earth is amorphous.

Figure 2:
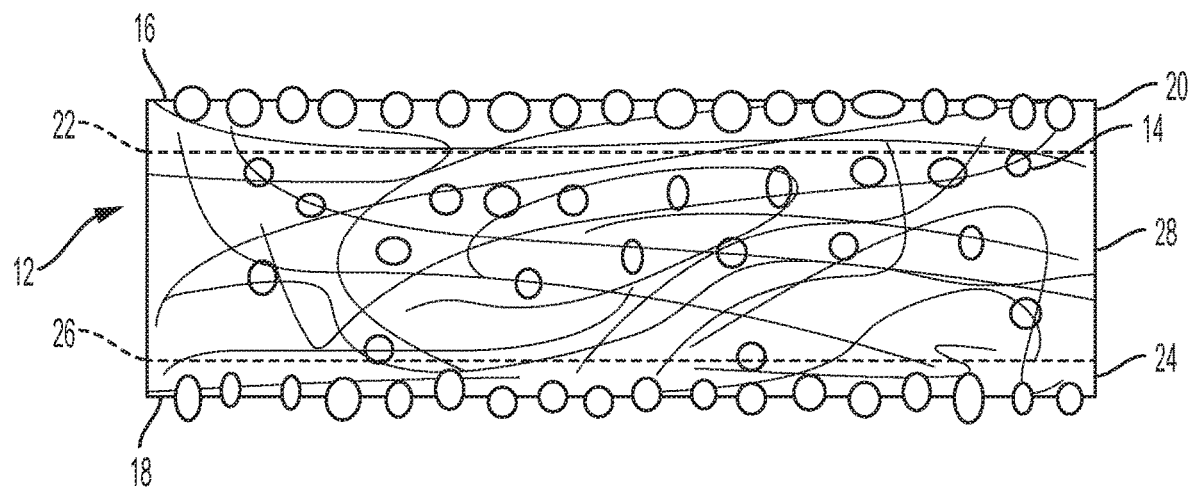
FIG. 2 illustrates a schematic cross-section view of a friction material including a filler material incorporated into the fibrous base material of FIG. 1 according to an example aspect.

FIG. 2 illustrates a schematic cross-section view of friction material 12 including filler material 14 incorporated into fibrous base material 10. As set forth below, filler material 14 may be incorporated into fibrous base material 100 using one or more aspect methods of producing a friction material. As shown in FIG. 2, friction material 12 includes first surface 16 and opposing second surface 18. Friction material 12 also has first surface region 18 bounded by first surface 16 and first depth 22 with a first thickness therebetween. Friction material 12 also has second surface region 24 bounded by second surface and second depth 24 with a second thickness therebetween. Friction material 12 also has bulk region 28 bounded by first and second depths 22 and 26 with a bulk thickness therebetween. The first and second thicknesses may be independently selected from any of the following values or within a range of any two of the following values: 50, 75, 100, 125 and 150 μm. The bulk thickness may be selected from any of the following values or within a range of any two of the following values: 0.3, 0.4, 0.5, 0.6, 0.7, 0.8, 0.9 and 1.0 mm. As shown in FIG. 2, the concentration of filler material 12 in first surface region 20 and/or second surface region 24 is higher than the concentration of filler material 12 in bulk region 28. The weight % of filler material 12 in first surface region 20 and/or second surface region 24 may be independently selected from any of the following values or within a range of any two of the following values: 20, 30, 40 and 50 weight %. The weight % of filler material 12 in bulk region 28 may be any of the following values or within a range of any two of the following values: 1, 5, 10, 15 and 20 weight %.

Figure 3:
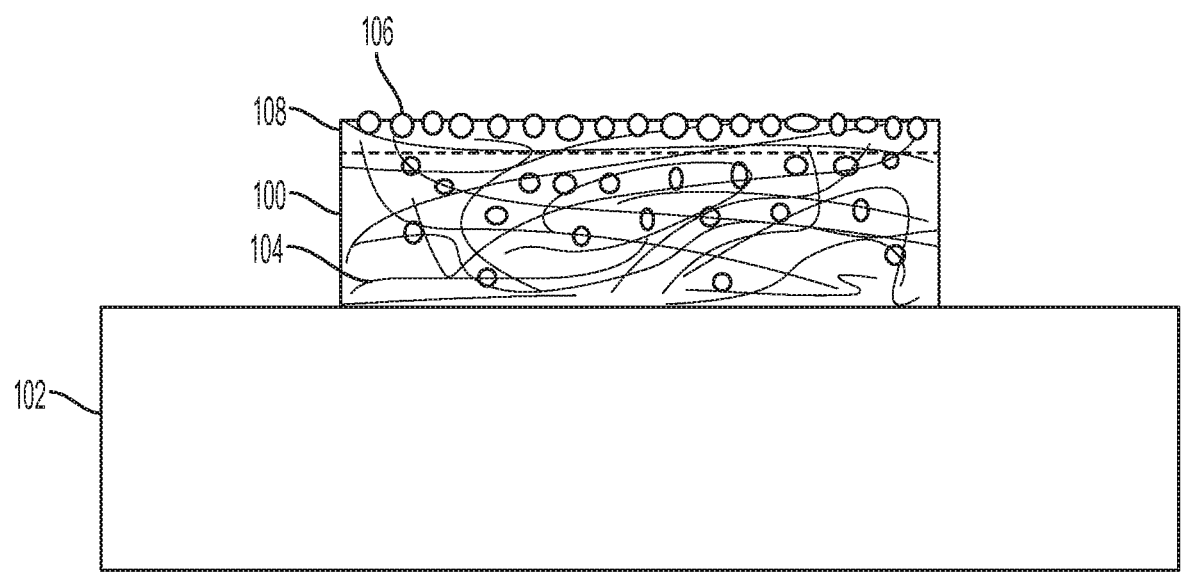
FIG. 3 illustrates the friction material of FIG. 2 used on a clutch plate according to an example aspect.

As shown in FIG. 3, friction material 100 is fixedly secured to clutch plate 102. Friction material 100 includes fibrous base material 104 including filler material 106. As set forth below, filler material 104 may be incorporated into fibrous base material 104 using one or more aspect methods of producing a friction material. Friction material 100 may further include a binder, such as a phenolic resin, a latex, a silane or mixtures thereof. Fibrous base material 104 may be an organic or inorganic fiber. Non-limiting examples include cellulose fibers, cotton fibers, aramid fibers, carbon fibers, or combinations thereof. Friction material 100 has a high concentration of filler material 106 at a first surface region 108 of friction material 100.

Figure 4:
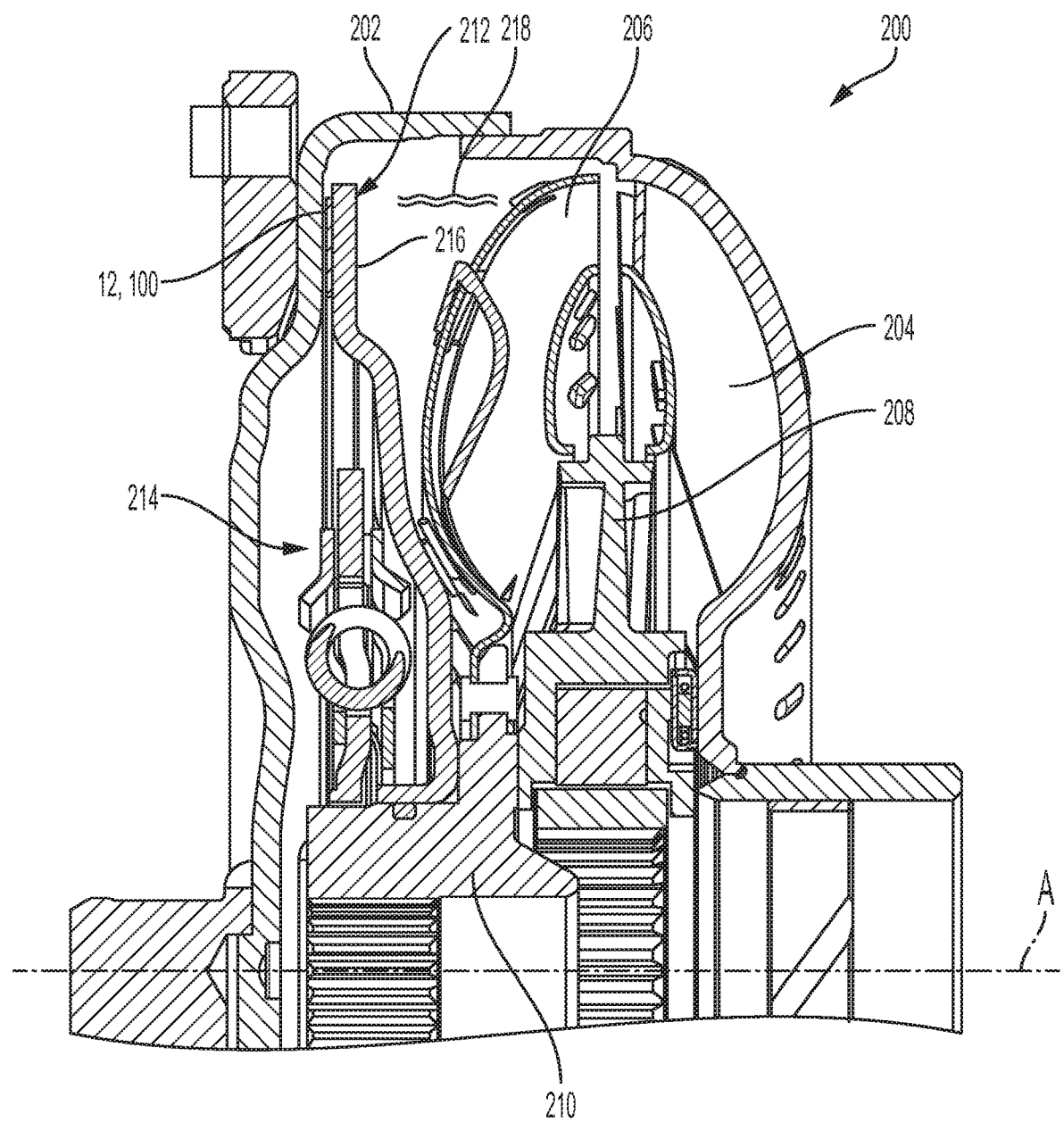
FIG. 4 illustrates a cross-sectional view of a torque converter having a friction material according to an example aspect.

FIG. 4 illustrates a cross-sectional view of torque converter 200 having friction material 12, 100 according to an example aspect. Torque converter 200 includes cover 202, impeller 204 connected to cover 202, turbine 206 in fluid communication with impeller 204, stator 208, output hub 210 arranged to non-rotatably connect to an input shaft (not shown) for a transmission, torque converter clutch 212 and vibration damper 214. Clutch 212 includes friction material 12, 100 and piston 216. Piston 216 is displaceable to engage friction material 12, 100 with piston 216 and cover 202 to transmit torque from cover 202 to output hub 210 through friction material 100 and piston 216. Fluid 218 is used to operate clutch 212. Friction material 12, 100 may be used in any clutch device for any torque converter configuration.

Figure 5:
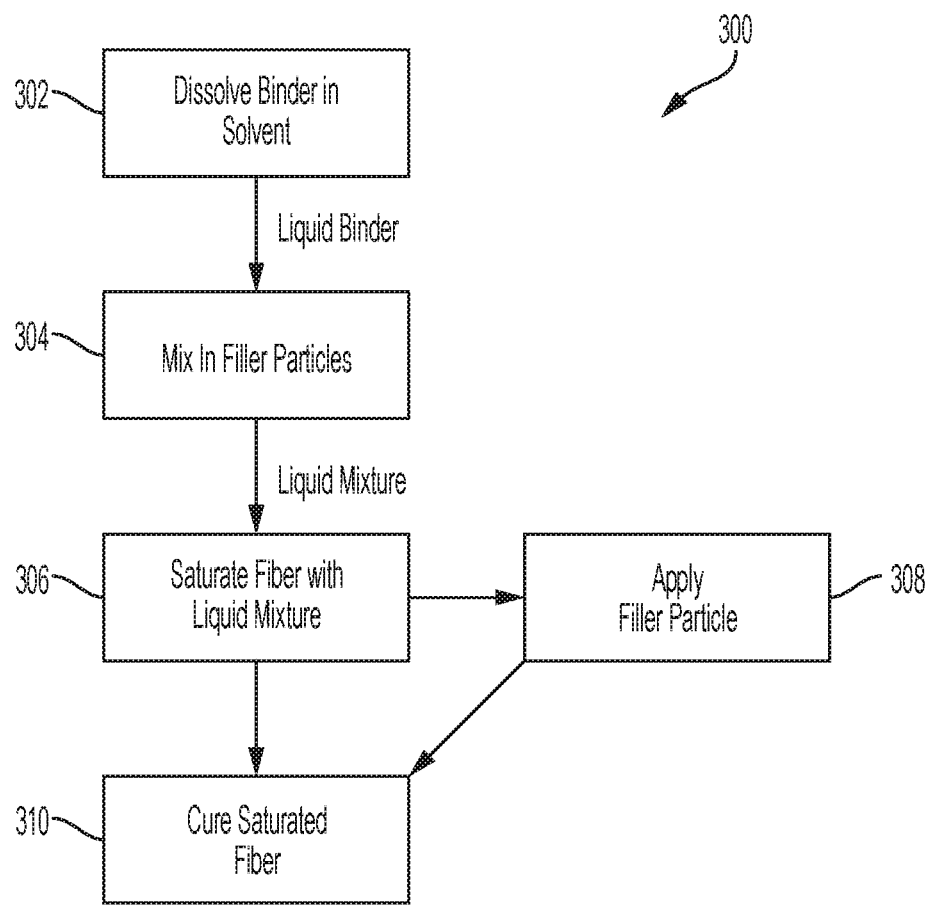
FIG. 5 illustrates a flowchart for a process of producing a friction material according to an example aspect.

FIG. 5 depicts a flowchart of process 300 that may be utilized to produce friction material 12 and/or 100. As shown in FIG. 5, process 300 includes multiple steps 302, 304, 306, 308 and 310. In certain aspects, one or more of these steps may be modified or omitted depending on the implementation.

In step 302 of process 300, a binder material is dissolved in a solvent. In one aspect, a solid binder material (e.g., pellets of solid binder material) is dissolved in a solvent to form a liquid binder material. The liquid binder material may be maintained in the vessel or transferred to a different vessel for further processing, including one or more of the other steps of process 300. Typically, the binder material is a phenolic resin. Upon curing, phenolic resin forms water as a byproduct of a reaction between a phenol and a formaldehyde. Arofene® 295-E-50 is a non-limiting example of a phenolic resin that can be used with friction materials.

In step 304 of process 300, filler particles are mixed with the liquid binder material to form a liquid mixture of filler particles and liquid binder. The filler particles may be any material or mixture of materials as set forth herein in one or more aspects, for example silica containing particles (e.g., diatomaceous earth particles). The liquid binder material may be any material or mixture of materials as set forth herein in one or more aspects, for example phenolic resin. In one example aspect, the filler particles are mixed substantially homogeneously with the liquid binder material. In another aspect, the filler particles are mixed substantially heterogeneously with the liquid binder material. In one aspect, the filler particles are present in the binder-filler liquid mixture in a concentration of 30 to 60 weight % of a total weight of the binder-filler liquid mixture.

In step 306 of process 300, a fibrous base material is saturated with the liquid mixture of filler particles and liquid binder. The fibrous base material may be any material or mixture of materials as set forth herein in one or more aspects. In one example, step 306 may be carried out by immersing the fibrous base material into a bath of the binder-filler liquid mixture. This immersion process may be carried out in a continuous manner. In one aspect, when the saturated fibrous base material emerges from the bath, one or a pair of rollers may be used to remove excess liquid mixture from the fibrous base material. In one aspect, step 308 may be carried out between steps 306 and 310. In another aspect, step 308 may not be carried out between steps 306 and 310.

In step 308 of process 300, filler particles are applied to first and/or second surface regions of a saturated fibrous base material to form a surface region impregnated saturated fibrous base material. The first surface region may oppose the second surface region. The thickness of first and second surface regions may be any thickness as set forth herein. For instance, first and second thicknesses may be independently selected from any of the following values or within a range of any two of the following values: 50, 75, 100, 125 and 150 µm. The concentration of filler particles after step 308 may be a weight % of filler material in first surface region and/or second surface region independently selected from any of the following values or within a range of any two of the following values: 20, 30, 40 and 50 weight %. In one aspect, application of filler particles in step 308 is a substitute for adding filler particles to the liquid binder that saturates the fibrous base material. In another aspect, application of filler particles in step 308 is in addition to the filler particles in the liquid binder that saturate the fibrous base material.

Applying step 308 may include entraining the filler particles in a gas stream (e.g., an air stream) to form an entrained gas stream that is applied to the first and/or second surface regions of the saturated fibrous base material. Applying step 308 may include placing the saturated fibrous base material and the filler particles under vacuum conditions and applying the filler particles to the first and/or second surface regions of the saturated fibrous base material under vacuum conditions. Applying step 308 may include scattering the filler particles over the first and/or second surface regions of the saturated fibrous base material. Applying step 308 may include applying the filler particles to the first and/or second surface regions of the saturated fibrous base material at a predetermined pressure. For example, the saturated fibrous base material may be compressed through a pair of rollers (e.g., nip rollers). The predetermined compression may be any of the following values or in a range of any two of the following values: 20, 25, 30, 35 and 40% range. In one example, the thickness of the saturated fibrous base material may be 1.0 mm and the roller gap may be 0.7 mm. In this example, the compression percentage may be 30%. In one aspect, the filler particles may be applied to one or a pair of rollers (e.g., nip rollers) used to drive off excess liquid binder from the saturated fibrous base material.

In step 310 of process 300, the saturated fibrous base material is cured at a predetermined temperature for a predetermined time to cure the saturated fibrous base material to form a friction material. The predetermined temperature may be one of the following values or in a range of any two of the following values: 150, 155, 165, 175, 185, 195 and 200° C. The predetermined time may be one of the following values or in a range of any two of the following values: 3.5, 4, 4.5 and 5 minutes. After step 310, the filler particles may be present in the friction material in a concentration of 20 to 50 weight % of a total weight of the friction material. In one aspect, step 308 may result in a friction material having a first concentration of filler particles in a first surface region and a second concentration of filler particles in a second surface region. The first and/or second concentration may be 20 to 50 weight % filler particles based on a total weight of the friction material.

Figure 6:
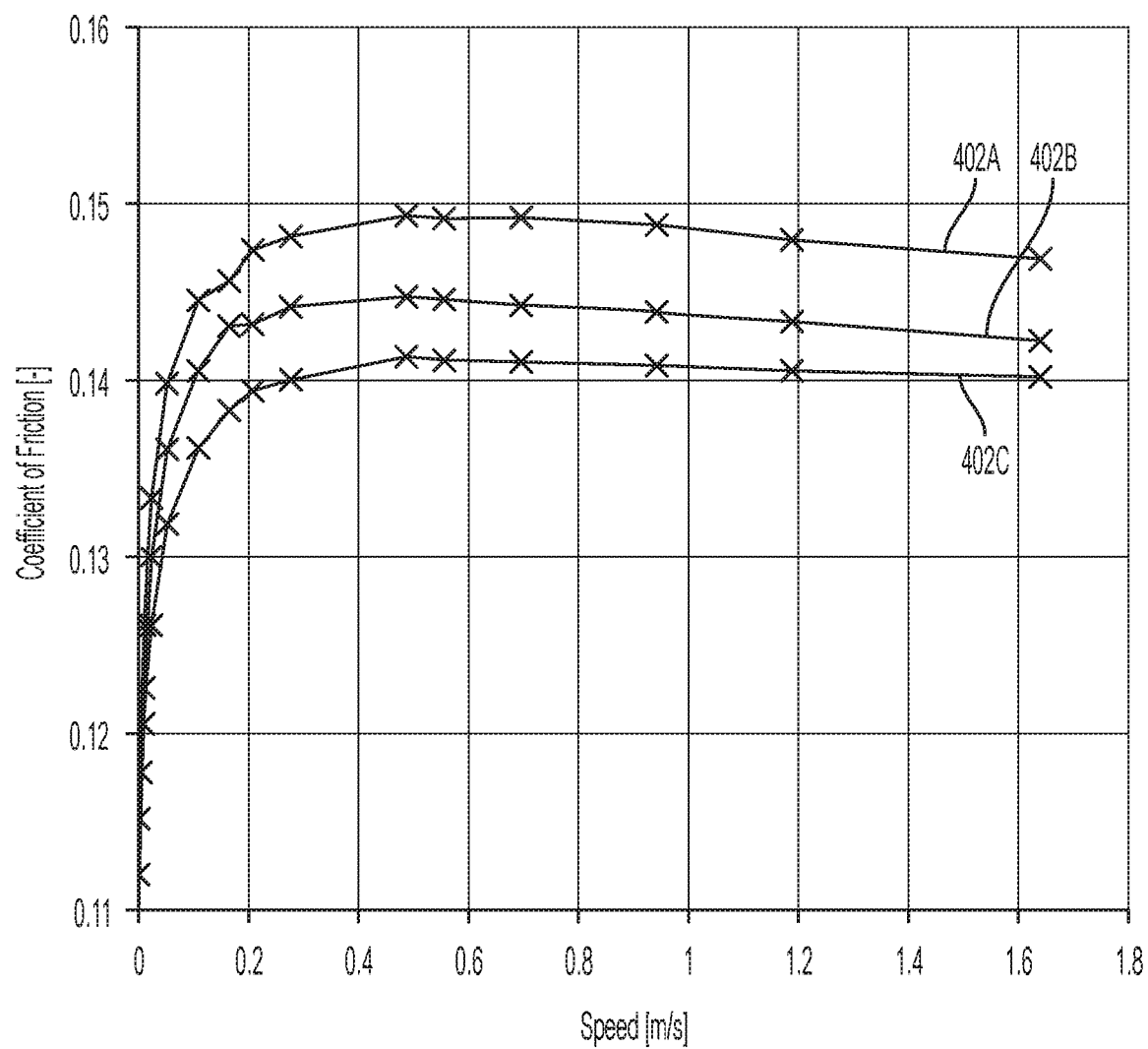
FIG. 6 illustrates a graph plotting friction coefficients versus speed for Friction Materials A, B and C according to different examples.

FIG. 6 illustrates graph 400 plotting friction coefficients versus speed at 3 MPa surface pressure at 120° C. for Friction Materials A, B and C according to different examples. Plots 402A, 402B and 402C for Friction Materials A, B and C show adequate friction performance at the conditions set forth. Friction Material A has a fibrous base material that is comprised of 100 weight % of aramid fibers. Friction Material B has a fibrous base material that is comprised of 50 weight % of cellulose fibers and 50 weight % of aramid fibers. Friction Material C has a fibrous base material that is comprised of 100 weight % of cellulose fibers. A filler material of diatomaceous earth particles was incorporated into each of the Friction Materials using process 300 (including steps 302, 304, 306, 308 and 310). The weight percentage of diatomaceous earth particles in each Friction Material is about 30 weight % based on the total weight of each Friction Material.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

PARTS LIST

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

Fibrous base material 10
Friction material 12
Filler material 14
First surface 16
Second surface 18
First surface region 20
First depth 22
Second surface region 24
Second depth 26
Bulk region 28
Friction material 100
Clutch plate 102
Fibrous base material 104
Filler material 106
First surface region 108
Torque converter 200
Cover 202
Impeller 204
Turbine 206
Stator 208
Output hub 210
Torque converter clutch 212
Vibration damper 214
Piston 216
Fluid 218
Process 300
Step 302

Step 304
Step 306
Step 308
Step 310
Graph 400
Plot 402A
Plot 402B
Plot 402C

What is claimed is:

1. A method of producing a friction material, the method comprising:
mixing silica containing filler particles and a liquid binder to form a binder-filler liquid mixture;
saturating a fibrous base material with the binder-filler liquid mixture to form a saturated fibrous base material, the saturated fibrous base material having a first surface region and a second surface region opposing the first surface region;
applying silica containing filler particles to the first and/or second surface regions of the saturated fibrous base material to form a surface region impregnated saturated fibrous base material; and
curing the surface region impregnated saturated fibrous base material at a predetermined temperature for a predetermined time to cure the surface region impregnated saturated fibrous base material to form the friction material having a first concentration of the silica containing filler particles in a first friction material surface region and a second concentration of the silica containing filler particles in a second friction material surface region, each of the first and second friction material surface regions have a thickness in a range of 50 to 150 µm, the first or second concentration is 30 to 50 weight % silica containing filler particles based on a total weight of the friction material in the first friction material surface region or the second friction material surface region, and a bulk region extending between the first and second friction material surface regions and the bulk region having a concentration of 1 to 10 weight % silica containing filler particles based on a total weight of the friction material in the bulk region.

2. The method of claim 1, wherein the first and second concentrations are 40 to 50 weight %.

3. The method of claim 1, wherein the saturating step is performed by immersing the fibrous base material into a bath of the binder-filler liquid mixture.

4. The method of claim 1, wherein the silica containing filler particles are present in the binder-filler liquid mixture in a concentration of 30 to 60 weight % of a total weight of the binder-filler liquid mixture.

5. The method of claim 1, wherein the binder is a phenolic resin.

6. The method of claim 1, wherein the silica containing filler particles are diatomaceous earth particles.

7. The method of claim 1, wherein the fibrous base material is a substantially pure fibrous base material not including any filler material.

8. A method of producing a friction material, the method comprising:
saturating a fibrous base material with a liquid binder to form a saturated fibrous base material, the saturated fibrous base material having a first surface region and a second surface region opposing the first surface region;
applying silica containing filler particles to the first and/or second surface regions of the saturated fibrous base material to form a surface region impregnated saturated fibrous base material; and
curing the surface region impregnated saturated fibrous base material at a predetermined temperature for a predetermined time to cure the surface region impregnated saturated fibrous base material to form the friction material having a first concentration of the silica containing filler particles in a first friction material surface region and a second concentration of the silica containing filler particles in a second friction material surface region, each of the first and second friction material surface regions have a thickness in a range of 50 to 150 µm, the first or second concentration is 30 to 50 weight % silica containing filler particles based on a total weight of the friction material in the first friction material surface region or the second friction material surface region, and a bulk region extending between the first and second friction material surface regions and the bulk region having a concentration of 1 to 10 weight % silica containing filler particles based on a total weight of the friction material in the bulk region.

9. The method of claim 8, wherein the first or second concentration is 40 to 50 weight %.

10. The method of claim 8, wherein the bulk region has a concentration of 1 to 5 weight %.

11. The method of claim 8, wherein the applying step includes entraining the silica containing filler particles in a gas stream to form an entrained gas stream and applying the entrained gas stream to the first and/or second surface regions of the saturated fibrous base material to form the surface region impregnated saturated fibrous base material.

12. The method of claim 8, wherein the applying step includes placing the saturated fibrous base material and the silica containing filler particles under vacuum conditions and applying the silica containing filler particles to the first and/or second surface regions of the saturated fibrous base material under vacuum conditions to form the surface region impregnated saturated fibrous base material.

13. The method of claim 8, wherein the applying step includes scattering the silica containing filler particles over the first and/or second surface regions of the saturated fibrous base material to form the surface region impregnated saturated fibrous base material.

14. The method of claim 8, wherein the applying step includes applying the silica containing filler particles to the first and/or second surface regions of the saturated fibrous base material at a predetermined pressure to form the surface region impregnated saturated fibrous base material.

15. The method of claim 8, wherein the fibrous base material is a substantially pure fibrous base material not including any filler material.

\* \* \* \* \*